US006802487B2

United States Patent
Heun et al.

(10) Patent No.: US 6,802,487 B2
(45) Date of Patent: Oct. 12, 2004

(54) FLOW REGULATING APPARATUS FOR A FLUID, IN PARTICULAR A PNEUMATIC CHOKE VALVE

(75) Inventors: Jürgen Heun, Dortmund (DE); Markus Löbel, Witten (DE); Jörg Führmann, Weisendorf (DE)

(73) Assignee: Demag Cranes & Components GmbH, Wetter (DE)

( * ) Notice: Subject to any disclaimer, the term of this patent is extended or adjusted under 35 U.S.C. 154(b) by 137 days.

(21) Appl. No.: 10/202,146

(22) Filed: Jul. 24, 2002

(65) Prior Publication Data

US 2003/0020036 A1 Jan. 30, 2003

(30) Foreign Application Priority Data

Jul. 24, 2001 (DE) .......................................... 101 34 972

(51) Int. Cl.[7] ............................ F16K 47/00; F16L 55/02
(52) U.S. Cl. ....................................... 251/122; 251/322
(58) Field of Search ................................ 251/122, 356, 251/322

(56) References Cited

U.S. PATENT DOCUMENTS

| 1,863,712 A | 6/1932 | Byfield |
| 2,904,305 A | 9/1959 | Novotny |
| 3,472,481 A | * 10/1969 | Spies, Jr. ...................... 251/85 |

FOREIGN PATENT DOCUMENTS

| DE | 33 42 405 C2 | 5/1987 |
| DE | 199 32 982 A1 | 1/2001 |
| GB | 988894 | 4/1965 |
| GB | 992613 | 5/1965 |

* cited by examiner

Primary Examiner—Edward K. Look
Assistant Examiner—John K. Fristoe, Jr.
(74) Attorney, Agent, or Firm—Henry M. Feiereisen

(57) ABSTRACT

A flow regulating apparatus for a fluid, in particular a pneumatic choke valve, includes a housing having an inlet port and an outlet port fluidly connected by a choke channel. A throttling piston is disposed in the choke channel for movement in longitudinal direction between an initial position and an end position. The throttling piston includes a tapered section to define with the choke channel an overflow passage whose cross section is dependent on a position of the throttling piston, wherein the tapered section is configured such that a movement of the throttling piston from the initial position to the end position results in a progressive increase of the cross section of the overflow passage.

4 Claims, 6 Drawing Sheets

FLOW REGULATING APPARATUS FOR A FLUID, IN PARTICULAR A PNEUMATIC CHOKE VALVE

CROSS-REFERENCES TO RELATED APPLICATIONS

This application claims the priority of German Patent Application, Ser. No. 101 34 972.6-14, filed Jul. 24, 2001, pursuant to 35 U.S.C. 119(a)–(d), the subject matter of which is incorporated herein by reference.

BACKGROUND OF THE INVENTION

The present invention relates, in general, to a flow regulating apparatus for a fluid, in particular a pneumatic choke valve.

German patent publication DE 199 32 982 A1 describes a pneumatic choke valve having a choke duct in the form of an inner cylinder for fluidly connecting an inlet port and an outlet port. Disposed in the choke duct is a cylindrical throttling piston which can be moved in longitudinal direction from outside. Normally, the throttling piston can be moved between two end positions. The throttling piston is configured to define an annular gap as overflow passage in the area of the choke duct edge. The cross section of the annular gap is hereby dependent on the axial position of the throttling piston.

German Pat. No. DE 33 42 405 C2 describes a choke valve having a throttling piston and a confronting contact surface of conical configuration to realize a degressive increase of the cross section of the overflow passage during movement of the throttling piston from an initial position to the end position. The cross sectional area as a function of the piston stroke produces in this type of choke valve a degressive characteristic line. In this way only a soft movement is effected at the moment of opening and closing because the conical configuration of the throttling piston and the confronting contact surface prevents the normally encountered suction and a resultant added acceleration of the piston.

When a hoist, in particular a pneumatically operated balancing hoist, is involved, the use of such a throttling piston does not enable a precise control for elevating and lowering small loads.

It would therefore be desirable and advantageous to provide an improved flow regulating apparatus for application with a pneumatically operated balancing hoist, to obviate prior art shortcomings and to allow a precise control for elevating and lowering small loads.

SUMMARY OF THE INVENTION

According to one aspect of the present invention, a flow regulating apparatus for a fluid, in particular a pneumatic choke valve, includes a housing having an inlet port and an outlet port fluidly connected by a choke channel, and a throttling piston disposed in the choke channel for movement in longitudinal direction between an initial position and an end position, wherein the throttling piston includes a tapered section to define with the choke channel an overflow passage whose cross section is dependent on a position of the throttling piston, wherein the tapered section is configured such that a movement of the throttling piston from the initial position to the end position results in a progressive increase of the cross section of the overflow passage.

The present invention resolves prior art problems by so providing the throttling piston with a taper as to realize a progressive increase of the cross section of the overflow passage during movement of the throttling piston from the initial position to the end position. The progressive increase of the overflow cross-section causes the volume flow, during even displacement of the throttling piston, to rise relatively slowly at the beginning and then to rise increasingly faster. As a result, when incorporated in a balancing hoist, a very sensitive and precise control for elevating and lowering a load is realized.

According to another feature of the present invention, the throttling piston has one end which may project out of the housing to form an actuating member actuatable by an operator for longitudinal movement of the throttling piston by means of an operator's thumb.

According to another feature of the present invention, the throttling piston may have a cylindrical configuration formed with the tapered section which extends radially and progressively decreases in a longitudinal direction, wherein the choke channel forms a cylindrical hollow space corresponding to the throttling piston. In this way, the overall fabrication is simplified.

According to another feature of the present invention, the throttling piston may be constructed to have three length portions, namely a cylindrical leading portion having an outer diameter, which is smaller than an inner diameter of the choke channel to thereby bound an annular gap to form the overflow passage in the area of the initial position, a central portion which includes an initial zone of the tapered area and defines the progressively increasing cross section of the overflow passage, and an end portion having a conical configuration defined by a steep cone angle for utilization a greatest possible pressure drop between the inlet port and the outlet port.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
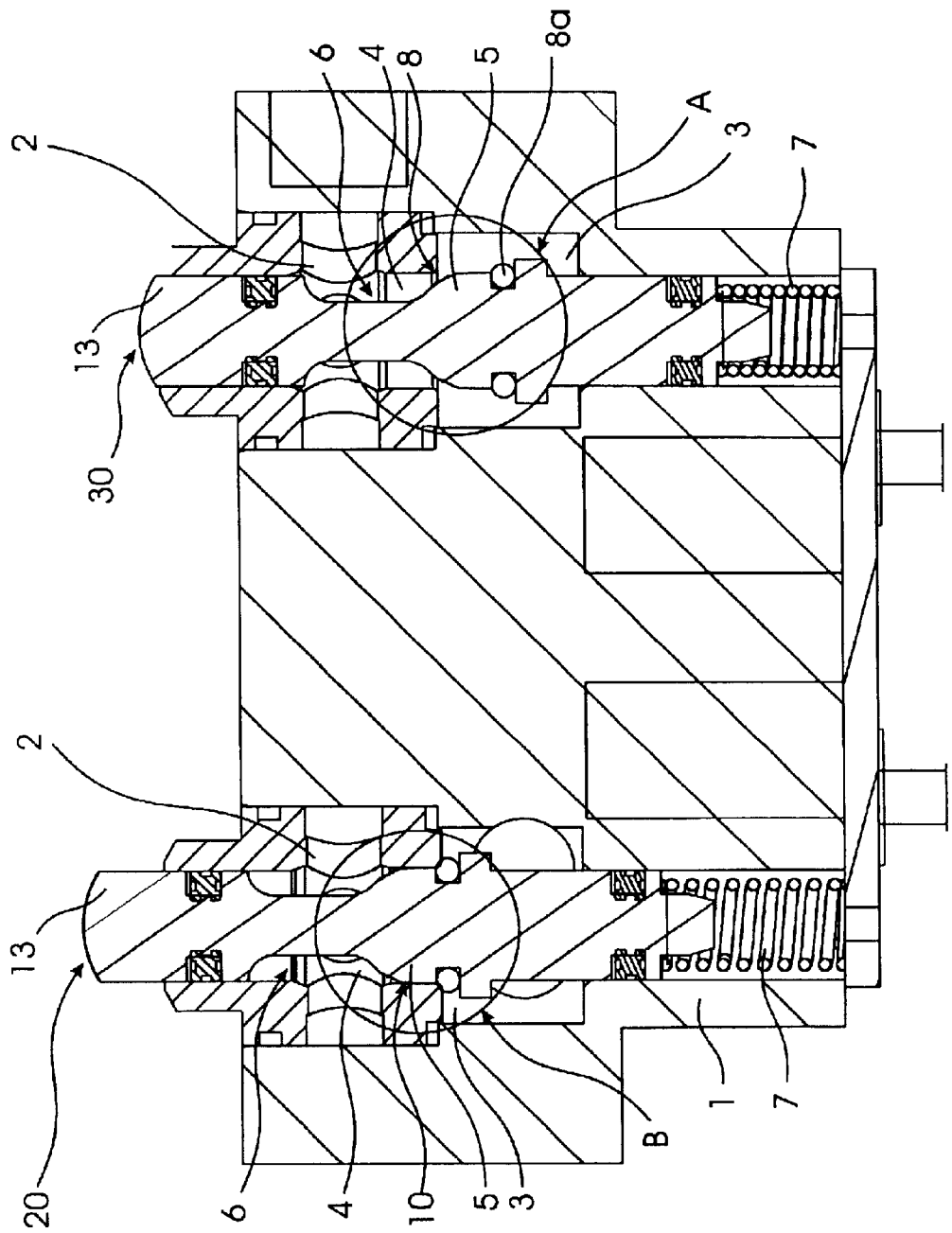
FIG. 1 is a schematic illustration of a flow regulating apparatus according to the present invention including two choke valves, with one choke valve in idle closed position, and the other choke valve in partially open position.

Throughout all the Figures, same or corresponding elements are generally indicated by same reference numerals.

Turning now to the drawing, and in particular to FIG. 1, there is shown a schematic illustration of a flow regulating apparatus according to the present invention, including a housing 1 accommodating two choke valves 20, 30 arranged in side-by-side relationship and intended for use in a pneumatic balancing hoist (not shown). In general, a choke valve is a throttling device used to reduce a flow rate in a flow line. In the nonlimiting example of FIG. 1, the left-hand choke valve 20 occupies a closed operating position, and the right-hand choke valve 30 occupies a partially open operating position. As the choke valves 20, 30 are of an identical construction, it will be understood by persons skilled in the art that a description of one of the choke valves is equally applicable to the other choke valve.

Each choke valve 20, 30 has an inlet port 2 and an outlet port 3 for a pressure fluid, e.g., compressed air. A fluid passageway or choke channel 4 fluidly connects the inlet port 2 and the outlet port 3. Disposed in the choke channel 4 between the inlet and outlet ports 2, 3 is a throttling piston 5 for movement in longitudinal direction between an initial position, in which the choke valve occupies the closed operating position (choke valve 20 in the exemplified illustration of FIG. 1), and an end position, in which the choke valve occupies the partially open operating position (choke valve 30 in the exemplified illustration of FIG. 1).

Figure 2A:
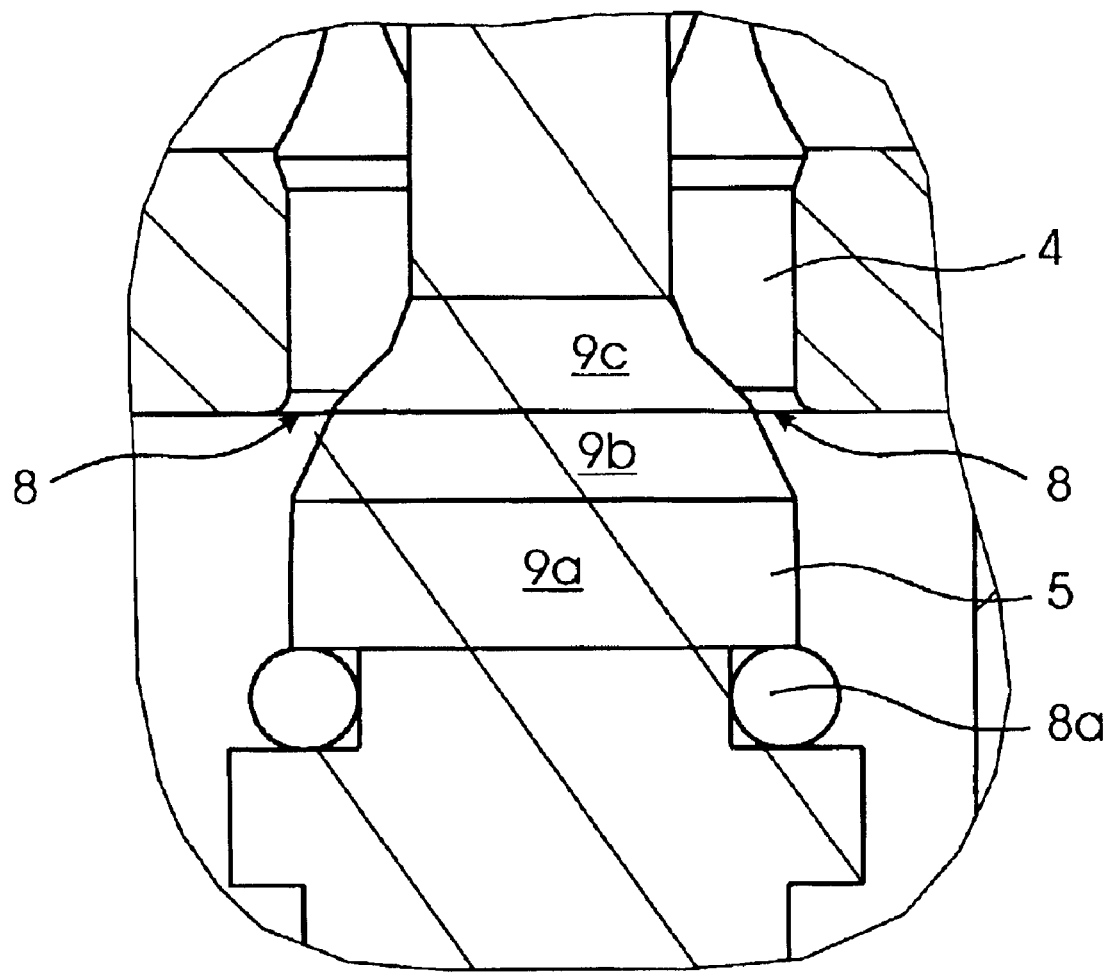
FIG. 2a is an enlarged detailed view of the area encircled A of the other choke valve in FIG. 1, showing a partially open overflow passage.
Figure 2B:
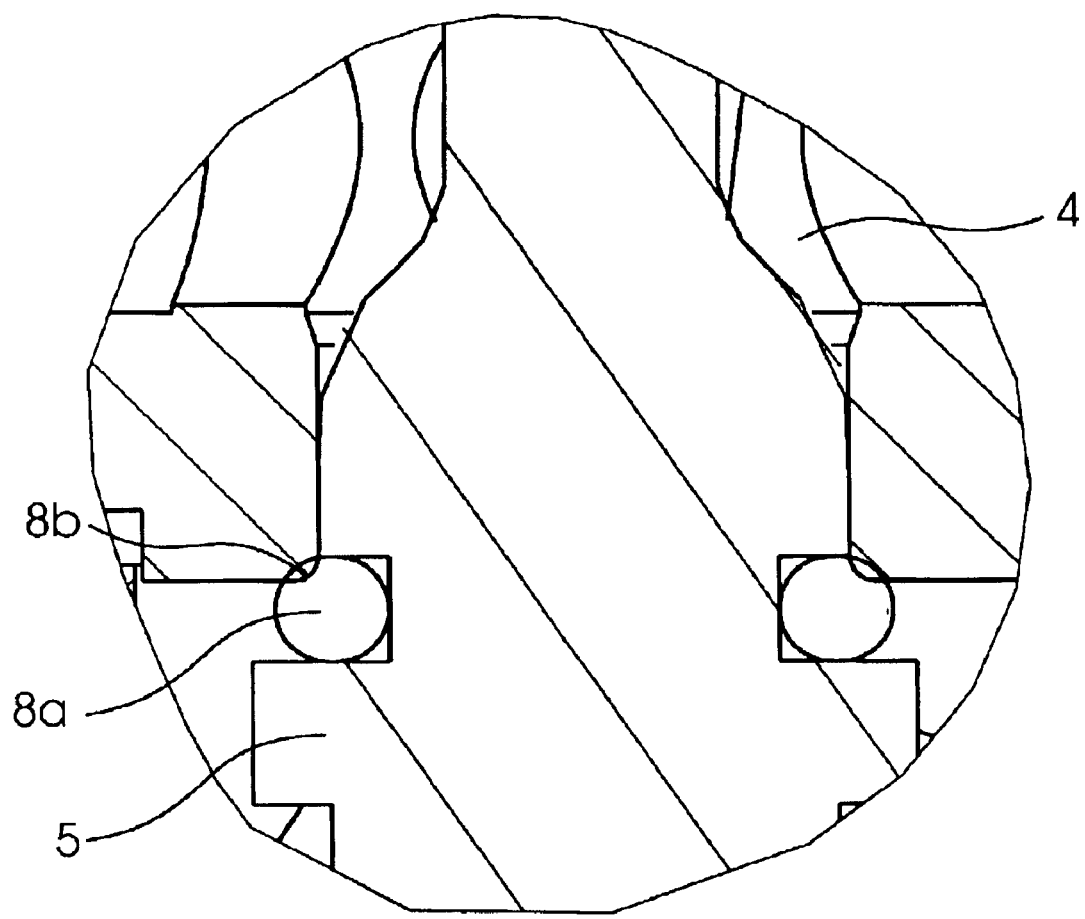
FIG. 2b is an enlarged detailed view of the area encircled B of the one choke valve in FIG. 1, showing the overflow passage closed.

The throttling piston 5 is essentially a metal cylinder having a central area formed with a radial taper 6. The choke channel 4 is formed as an internal cylinder corresponding to the throttling piston 5 and thus is configured as cylindrical hollow space. Each of the choke valves 20, 30 has one end (the upper end here, as viewed in FIG. 1) which juts out of the housing 1 to form an actuating member 13 to allow a user's thumb to operate the choke valves 20, 30 and to thereby control a volume flow of the pressure fluid between the inlet port 2 and the outlet port 3 via an overflow passage (annular flow gap) 8 defined by the taper 6 and the choke channel 4. Thus, the cross section of the overflow passage 8 is dependent on the axial position of the throttling piston 5. As shown in particular in FIG. 2a, the overflow passage 8 is depicted in open state to allow a fluid flow between the inlet and outlet ports 2, 3, whereas FIG. 2b shows the overflow passage 8 in closed state so that the fluid communication between the inlet and outlet ports 2, 3 is cut. In the closed position, a sealing ring 8a of the throttling piston 5 abuts against a shoulder 8b of the housing 1, as shown in particular in FIG. 2b, to cut the fluid communication between the inlet and outlet ports 2, 3.

At the other opposite end, each throttling piston 5 is supported by the housing 1 via a spring element 7 which loads the throttling piston 5 to seek the initial position.

Figure 3:
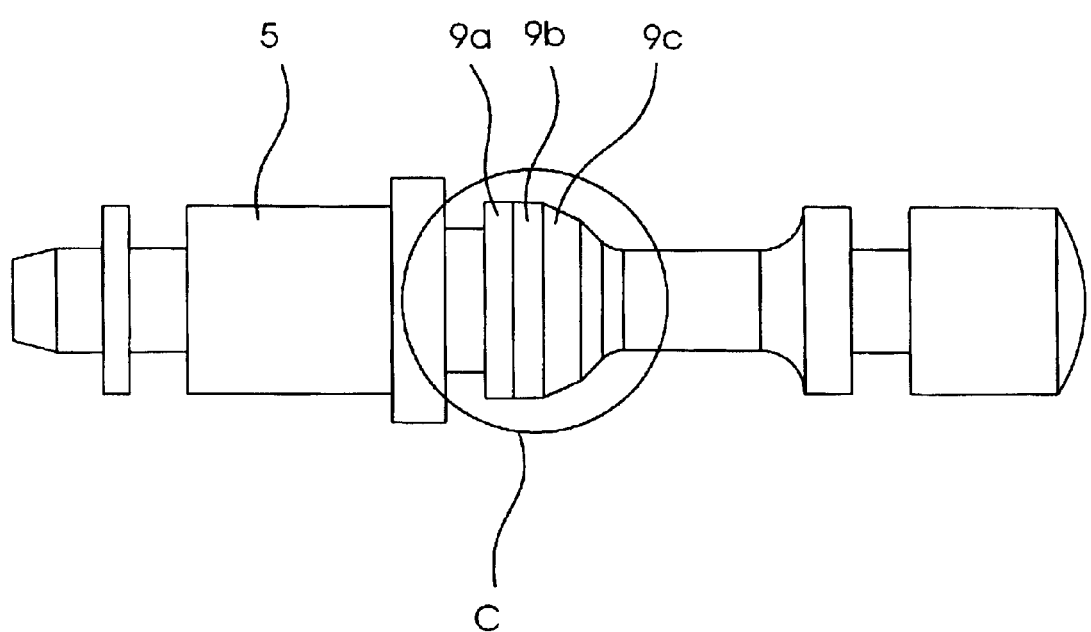
FIG. 3 is a schematic illustration of a throttling piston of the choke valves of FIG. 1.
Figure 4:
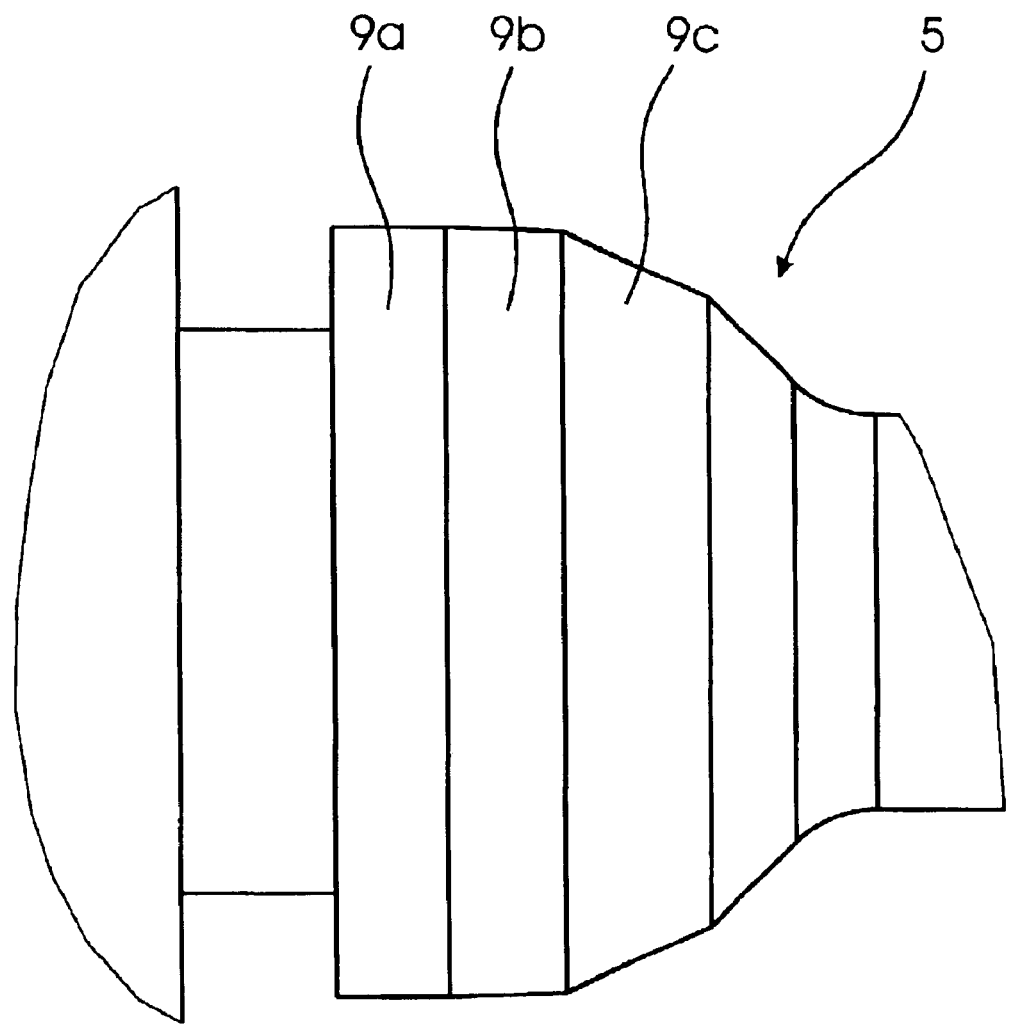
FIG. 4 is an enlarged detailed cutaway view of the area encircled C of the throttling piston.
Figure 5:
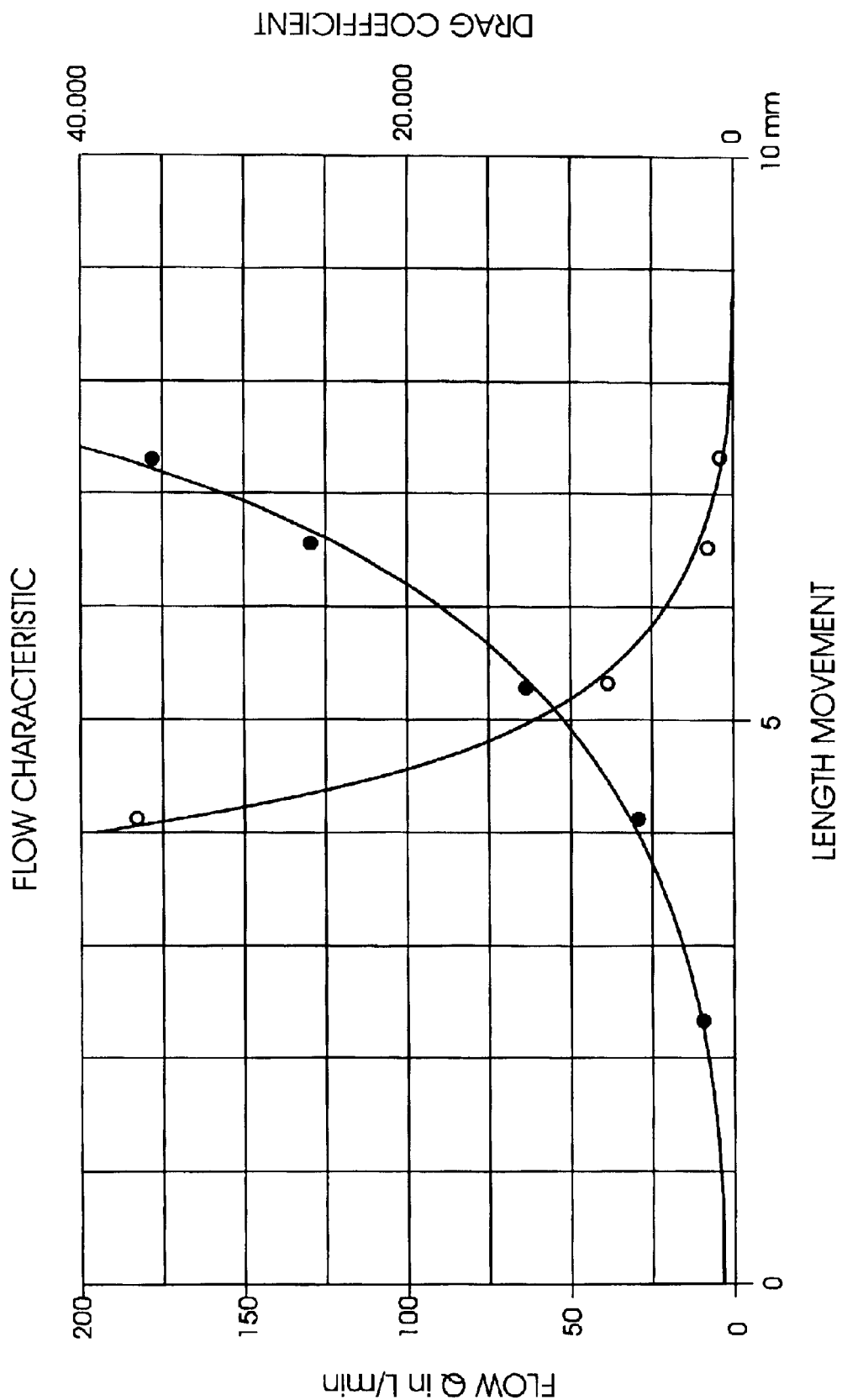
FIG. 5 is a graphical illustration of the flow characteristic of the choke valve according to the invention, showing the flow Q in L/min in continuous line and the drag coefficient $\xi$ in dotted line as a function of the length movement in mm of the throttling piston.

Referring now to FIG. 4, there is shown an enlarged detailed cutaway view of the area encircled C of the throttling piston 5 of FIG. 3, to more clearly illustrate the midsection of the throttling piston. As shown in FIG. 4, the throttling piston 5 has three distinct controlling length portions 9a, 9b, 9c. The leading or starting length portion 9a has a cylindrical configuration and is defined by an outer diameter which is smaller than an inner diameter of the choke channel 4 to thereby form an annular gap 10 (FIG. 1) which is determinative for the volume flow of pressure fluid as a consequence of its effective length. In this zone, the overflow passage 8 may be considered as a residual overflow passage. The length portion 9a terminates in the central length portion 9b, which includes the initial zone of the taper 6. As a consequence of the increasingly tapered area in radial direction (decreasing diameter per length unit of the throttling piston 5), the overflow cross section of the overflow passage 8 increases progressively and thus becomes greater superproportionally in dependence on the longitudinal displacement of the throttling piston 5. FIG. 5 is a graphical illustration of the flow characteristic line of the choke valve according to the invention, showing the flow Q in L/min in continuous line and the drag coefficient $\xi$ in dotted line as a function of the length movement in mm of the throttling piston 5.

The central length portion 9b terminates in an end portion 9c which has a conical configuration with a steep cone angle in comparison to the inclination of the central portion 9b. In this zone, a sensitive control of the balancing hoist is no longer required. It is only relevant to exploit the pressure drop between the inlet and outlet ports 2, 3 in an optimal manner in order to attain a high load velocity.

The configuration of the throttling piston 5 with the three length portions 9a, 9b, 9c ensures a precise control of the hoist as a result of the continuous progressive increase of the overflow cross section.

While the invention has been illustrated and described as embodied in a flow regulating apparatus for a fluid, in particular a pneumatic choke valve, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents.

What is claimed is:

1. A flow regulating apparatus for a fluid, in particular a pneumatic choke valve, comprising:
    a housing having an inlet port and an outlet port fluidly connected by a passageway; and
    a throttling piston disposed in the passageway for movement in longitudinal direction between an initial position and an end position, said throttling piston including a curved tapered section to define with the passageway an overflow passage whose cross section is dependent on a position of the throttling piston, wherein the tapered section is configured such that a movement of the throttling piston from the initial position to the end position results in a progressive increase of the cross section of the overflow passage, wherein the throttling piston has three length portions which are defined by a leading cylindrical portion having an outer diameter, which is smaller than an inner diameter of the passageway to thereby bound an annular gap to form the overflow passage in the area of the initial position, a central portion adjoining the cylindrical portion and including an initial zone of a curved tapered section define the progressively increasing cross section of the overflow passage, and an end portion having a conical configuration defined by a steep cone angle for utilization a greatest possible pressure drop between the inlet port and the outlet port.

2. The apparatus of claim 1, wherein the throttling piston has one end which projects out of the housing to form an actuating member which is actuatable by an operator for longitudinal movement of the throttling piston by means of an operator's thumb.

3. The apparatus of claim 1, wherein the throttling piston has a cylindrical configuration formed with the tapered section, which extends radially and progressively decreases in a longitudinal direction, wherein the passageway forms a cylindrical hollow space corresponding to the throttling piston.

4. The apparatus of claim 1, wherein the central portion has a curved configuration to define a curvature which increases in the direction of the end portion.

* * * * *

UNITED STATES PATENT AND TRADEMARK OFFICE
CERTIFICATE OF CORRECTION

PATENT NO. : 6,802,487 B2
DATED : October 12, 2004
INVENTOR(S) : Jürgen Heun, Markus Löbel and Jörg Führmann It is certified that error appears in the above-identified patent and that said Letters Patent is hereby corrected as shown below:

<u>Column 4,</u>
Line 48, after "section" insert -- to --.

Signed and Sealed this

First Day of February, 2005

JON W. DUDAS
*Director of the United States Patent and Trademark Office*